June 5, 1951 G. M. BUEHRIG 2,556,062
VEHICLE TOP CONSTRUCTION
Filed July 13, 1948 3 Sheets-Sheet 2
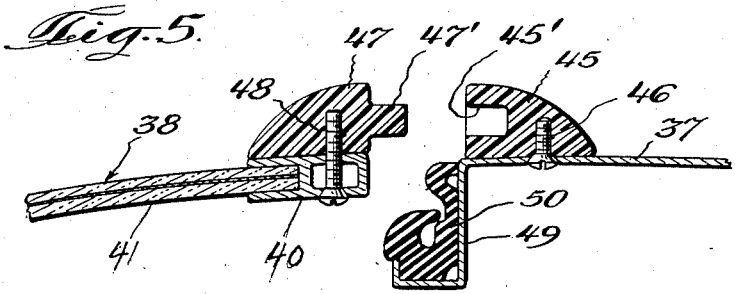
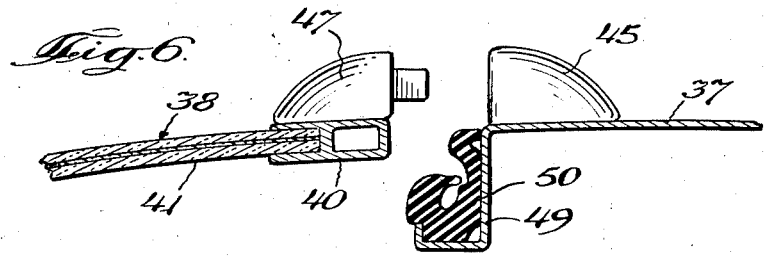
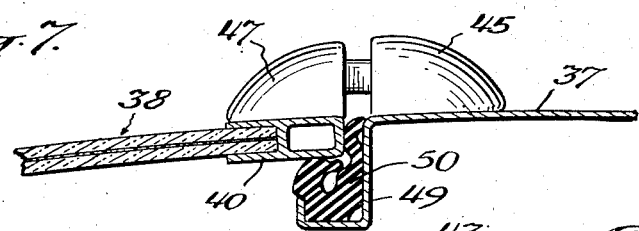
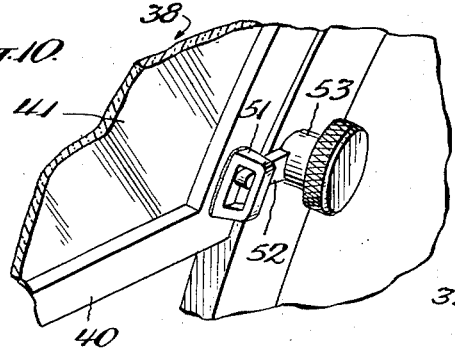
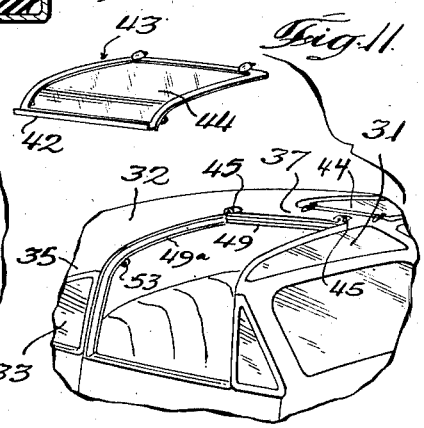
Inventor
Gordon M. Buehrig
By Mason, Kolehmainen, Rathburn & Wyss
Attorneys June 5, 1951 G. M. BUEHRIG 2,556,062
VEHICLE TOP CONSTRUCTION
Filed July 13, 1948 3 Sheets-Sheet 3
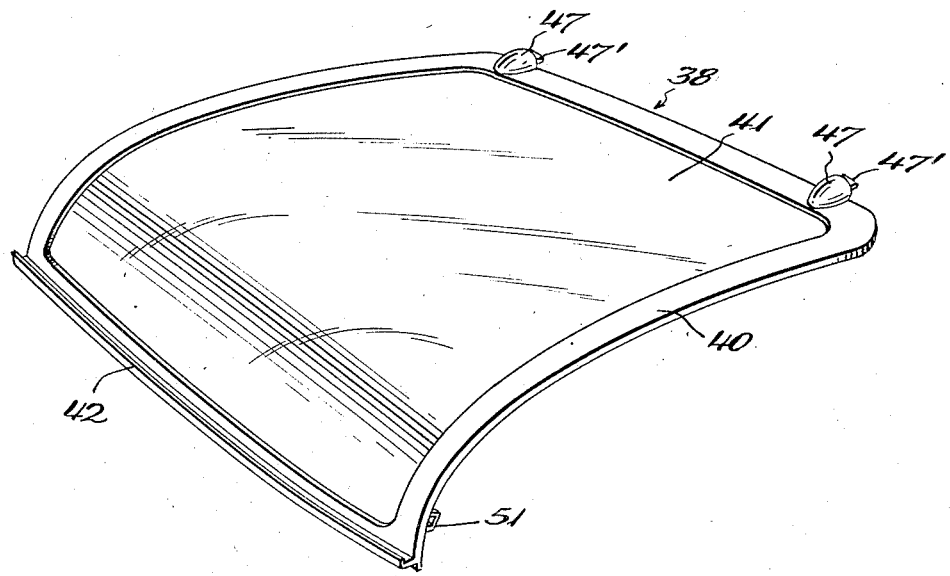
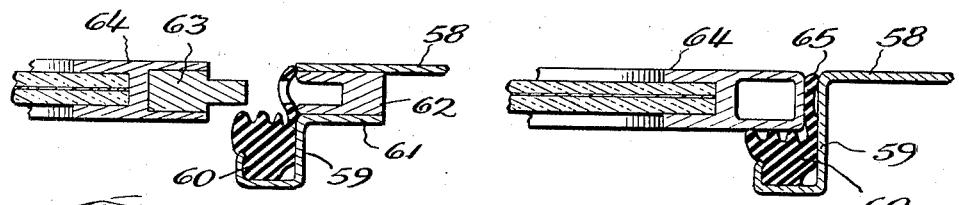
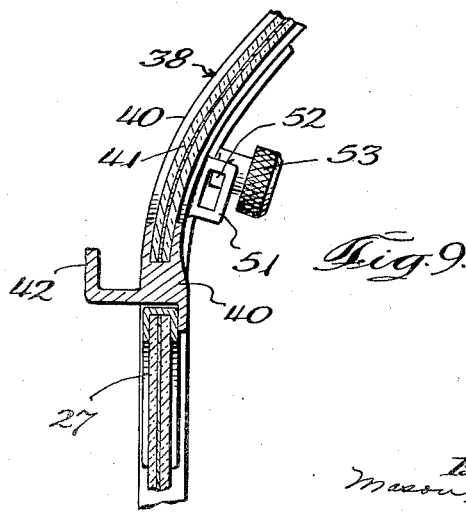
Inventor
Gordon M. Buehrig
By Mason, Kolehmainen, Rathburn & Wyss
Attorneys Patented June 5, 1951

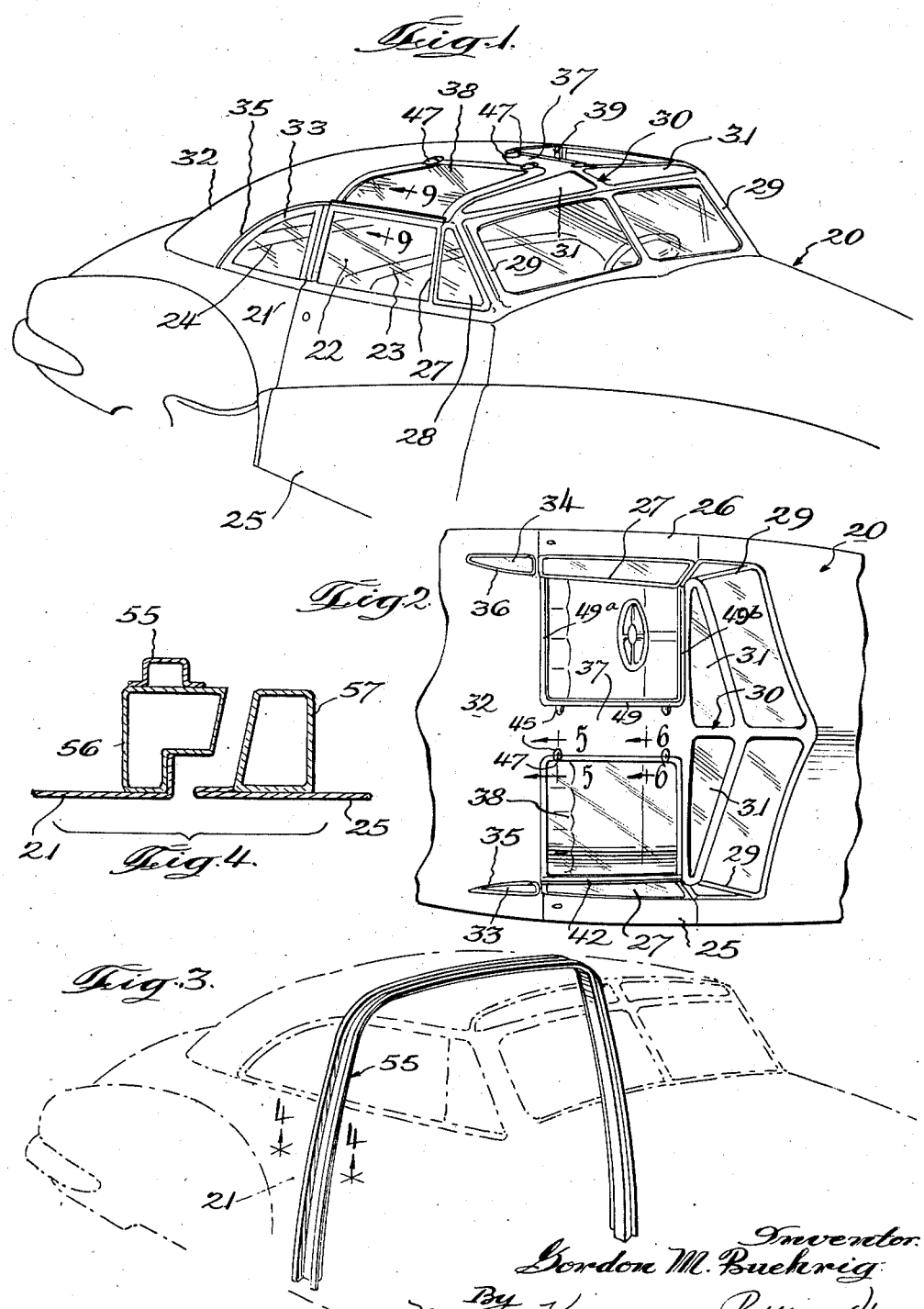

2,556,062

UNITED STATES PATENT OFFICE 2,556,062

VEHICLE TOP CONSTRUCTION

Gordon M. Buehrig, South Bend, Ind.

Application July 13, 1948, Serial No. 38,408

4 Claims. (Cl. 296—137)

This invention relates to vehicles, more particularly to top structures for vehicles of the sedan or coupé type having enclosed passenger compartments and the invention has for an object the provision of improved structures of this character.

The apparent personal preference of many persons for so-called convertible type motor vehicles wherein the top may be raised or lowered as desired to provide an open or an enclosed passenger compartment, has resulted in many attempts to improve such top constructions in order to eliminate the noises and rattles, the ill fitting appearance, the mechanical difficulties in raising and lowering the top, and the safety hazards due to lack of rigidity that are ordinarily encountered and that are characteristic of convertibles, particularly after the vehicle has been used for some time. In short, the objective has been to approach the appearance, quietness, safety and other advantages that are characteristic of sedan and coupé type motor vehicles having permanently enclosed passenger compartments. Such attempted improvements have not been entirely successful and it is a further object of this invention to provide a vehicle top construction which is essentially of the type providing an enclosed passenger compartment with the attendant advantages but which may be opened to a substantial degree to simulate an open passenger compartment.

Another object of the invention is the provision of a strong and rigid top structure having openings therein adapted to be closed by readily securable but removable panels, also of novel construction.

A still further object of the invention is the provision of a top structure of this character including interchangeable transparent and opaque panels.

An additional object is the provision of a strong and rigid top construction that provides an attractive appearance, that may be readily adjusted to provide either an enclosed or a substantially open passenger compartment, and that insures a high degree of turn-over protection.

In carrying out the invention in one form a top structure is provided for a vehicle having a passenger compartment which top structure comprises a rigid rear-top-portion extending upwardly and forwardly from the rear edge of the passenger compartment to substantially the middle thereof together with a rigid center panel of substantially less width than the rear top portion extending forwardly therefrom over the passenger compartment and supported at its forward end on a windshield frame-and- header structure which extends upwardly from the forward edge of the passenger compartment. The top structure thus provided includes a pair of opositely disposed openings therein bounded on three sides by the forward edge of the rear-top-portion, by the center-panel and by the windshield header, respectively, and readily removable panels which may be either of transparent or opaque construction are provided for closing the openings and for effecting a weathertight seal along the three sides thereof.

In accordance with a further feature of the invention the top structure includes an overturn member in the form of a vertically disposed arch having the leg portions thereof secured to the sides of the passenger compartment immediately adjacent the rear edges of the door openings to the compartment and having the yoke portion extending over the passenger compartment immediately contiguous to the forward edge of the rear-top-portion.

For a more complete understanding of the invention reference should now be had to the drawings in which:

Fig. 1 is a perspective view of a motor vehicle of conventional construction provided with a top structure embodying the present invention;

Fig. 2 is a fragmentary top plan view of the vehicle shown in Fig. 1;

Fig. 3 is a perspective view of an over-turn structure embodying the present invention applied to the vehicle of Figs. 1 and 2, the vehicle being shown in phantom to indicate the location of the over-turn structure;

Fig. 4 is a detail sectional view taken along the line 4—4 of Fig. 3 omitting weather strip trim parts;

Fig. 5 is a detail sectional view taken along the line 5—5 of Fig. 2 showing the parts in partly assembled relation;

Fig. 6 is a similar sectional view taken along the line 6—6 of Fig. 2;

Fig. 7 is a sectional view similar to Fig. 6 but showing the parts in assembled relation to illustrate the weathertight seal;

Fig. 8 is a detail perspective view on a somewhat larger scale of one of the closure panels employed in the vehicle of Figs. 1 and 2;

Fig. 9 is a detail sectional view on a larger scale taken along the line 9—9 of Fig. 1;

Fig. 10 is a fragmentary perspective view showing one form of latch means which may be employed for securing the closure panel of Fig. 8;

Fig. 11 is a fragmentary exploded perspective view showing a vehicle embodying the present invention provided with opaque closure panels; and Figs. 12 and 13 are detail sectional views similar to Figs. 6 and 7, respectively, showing a modified form of locking and sealing means for removably securing the closure panels in weathertight relation.

Referring now to the drawings, the invention is shown as applied to a conventional motor vehicle 20 having a body 21 forming the usual passenger compartment 22 including front and back seats 23 and 24, the body 21 being of the two-door type and including suitable doors 25 and 26 on opposite sides thereof which serve to open and close the door openings into the passenger compartment. In the particular vehicle shown, the doors 25 and 26 are provided with the usual vertically slidable window and frame 27, but in accordance with the present invention the doors differ from the type of door usually employed in a sedan or coupe type vehicle in that the supporting frames at the rear and the top edges of the door are omitted, the door in this sense being similar to the type of door employed in conventional convertible type vehicles. Likewise each of the doors 25 and 26 is provided adjacent the forward portion thereof with a conventional substantially triangular pivoted window 28.

Adjacent the forward edge of the passenger compartment 22 the vehicle 20 is provided with an upstanding windshield frame-and-header structure comprising a pair of rearwardly sloping corner posts 29 and a laterally extending header portion 30. Although a solid header member of conventional construction may be employed, an open type header is shown, consisting of suitable framing for receiving a pair of transparent panes 31. A solid header construction could include, in effect, a portion of the roof panel or the header could be conventional construction as now is commonly used.

The improved top structure embodying the present invention, as shown best in Figs. 1 and 2, comprises a rear-top-portion 32 which is of the same width as the passenger compartment 22 and which is shaped as shown so as to extend upwardly and forwardly from the rear edge of the passenger compartment. The rear-top-portion 32 preferably includes the usual rear window (not shown) and likewise includes a pair of oppositely disposed side windows 33 and 34 having suitable drip moldings 35 and 36 associated with them. As shown, the rear-top-portion 32 terminates at substantially the middle of the passenger compartment, preferably in a plane substantially coincident with the rear edges of the door openings, and a rigid center panel 37, which is of substantially less width than the rear-top-portion 32, extends forwardly from the forward edge of the rear-top-portion 32 over the passenger compartment, the forward edge of the center panel 37 being rigidly secured to and supported by the windshield header 30.

The rear-top-portion 32 and the center panel 37 are integrally formed and may be of any suitable rigid construction but are preferably of the one-piece sheet metal construction employed in the so-called "turret" tops heretofore known in the art. In the solid header construction the entire roof structure including the rear portion 32, the center panel 37 and the forward roof-header can be a single structural unit. It will thus be observed that the top construction thus far described provides a rigid vehicle top having substantially the appearance of the conventional top structures employed in sedan and coupé type vehicles but differs therefrom in that it includes a pair of oppositely disposed openings bounded on three sides by the edges of rear-top-portion 32, the center panel 37, and the windshield header 30. The fourth side of each of the top openings is unobstructed and consequently, as shown best in Fig. 11, the passenger compartment, when the vertically slidable door windows 27 are lowered, is substantially open, thereby providing a passenger compartment which simulates the open compartment provided in conventional convertible type vehicles. If desired in other types of cars, additional openings could be provided.

However, in accordance with the present invention, closure panels 38 and 39 are provided which are adapted to be removably secured in the top openings and to cooperate with the remainder of the top structure to provide an enclosed passenger compartment such as is employed in conventional sedan and coupé type vehicles. The panels 38 and 39 are of identical construction and as shown best in Figs. 1, 2 and 8 comprise a suitable frame 40 for receiving and supporting a sheet of transparent material 41 which may be formed of a suitable transparent plastic material or may constitute a pane of safety glass, so that when the panels are positioned in the top openings a sun-type vehicle will be obtained even though the passenger compartment is enclosed.

As shown, the panels 38 and 39 are shaped to conform to the forward edges of the rear top portion 32, to the side edges of the center panel 37 and to the rear edges of the windshield header 30, while the outer edges of the panels, which overlie the respective doors 25 and 26, are provided with drip moldings 42 for cooperating with the drip moldings 35 and 36 overlying the windows 33 and 34 in the rear-top-portion. In Fig. 2 the vehicle is shown with the left hand closure panel 39 removed and the window of the door 26 in raised postition, the closure panel 38 being secured in place so as to close the top opening overlying the right hand portion of the front seat of the vehicle.

In lieu of the transparent closure panels 38 and 39 a pair of opaque closure panels 43 may be provided, as shown in Fig. 11, which are identical with the closure panels 38 and 39 except that an opaque sheet of material 44 is substituted for the transparent panes or sheets 41. When such opaque closure panels are employed, the top structure provides not only weathertightness but also protection from the sun which is advantageous on bright days or on long trips.

Although various arrangements and devices may be employed for removably securing the closure panels in the top openings in weathertight relation, the embodiment of the invention shown contemplates the use of suitable dowel connections at the inner edges of the panels together with suitable latch means disposed adjacent the outer edges. As shown best in Figs. 5, 6 and 7 the center panel 37 of the top structure is provided adjacent the longitudinal edges thereof with a plurality of socket members 45 which may be secured thereto in any suitable fashion, as for example, by screws 46, and the corresponding inner edges of the closure panels 38 and 39 are provided with cooperating dowel members 47 secured thereto by suitable screws 48. Likewise, as shown in Figs. 5, 6 and 7, each of the longitudinal edges of the center panel 37 is provided with a gutter 49 for receiving a suitable sealing strip 50 formed of rubber or similar deformable material. The edges of the rear-top-portion 32 and of the windshield header 30 which define the opposite edges of the top openings are provided with gutters 49a and 49b (Fig. 2) similar to the gutter 49 and the sealing strip 50 preferably constitutes a continuous strip extending entirely around the edges of the top openings and disposed within the gutters 49, 49a and 49b.

In Figs. 8, 9 and 10 suitable latch means are shown for cooperation with the dowel connections in order to secure the closure panels in place. As shown, this latch means comprises a catch or loop 51 adapted to receive a latch finger 52 carried by a rotatable knob 53. Preferably, two of the catches 51 are employed, one disposed adjacent each of the edges of the closure panel for cooperation with the rotatable latches 52, one of the latches 52 being mounted adjacent the edge of the rear-top-portion 32 and the other of the latches 52 being mounted on the windshield header 30. Other types of latching arrangements can be used.

In order to assemble the closure panels in the top openings and secure them in weathertight relation therein, it is necessary only to insert the dowel pins 47' on the dowel members 47 into the sockets 45' of the socket members 45 and then to force the outer edge of the panel downwardly to a position in which the knobs 53 may be rotated to engage the latch fingers 52 in the respective catches 51. In Figs. 5 and 6 the closure panel 38 is shown in spaced relation to the center panel 37 just prior to insertion of the dowel pins 47' into the sockets 45' and in Fig. 7 the panel 38 is shown disposed in latched and weathertight relation with respect to the top structure, the sealing strip 50 being deformed, as shown, by engagement therewith of the frame 40 of the panel 38.

It will now be observed that an improved top structure has been provided in which either transparent or opaque closure panels may be secured in, or removed from, suitable top openings in order to provide a substantially open passenger compartment, or an enclosed passenger compartment having sun openings in the top thereof, or an enclosed passenger compartment providing sun protection. Although the top structure thus far described is of such construction as to provide a high degree of rigidity and structural strength, the present invention also contemplates the provision of additional protection in the form of an over-turn structure. As shown in Figs. 3 and 4, this over-turn structure comprises an arch member 55 which may be of any desired cross-section but which is preferably of the channel form shown in Fig. 4, and which is disposed in the vehicle in substantially vertical relation with the leg portions of the arch extending downwardly along the sides of and secured to the body 21 preferably in a position just rearwardly of the door openings. The yoke portion of the arch extends laterally of the passenger compartment in contiguous relation to the front edge of the rear-top-portion 32.

Since the over-turn member 55 functions primarily to prevent collapse or crushing of the roof structure in the event of an accident resulting in the vehicle turning over, it is not necessary that the turn-over member 55 be rigidly secured to the rear-top-portion 32 but it may be so secured in any suitable manner if additional rigidity is desired. The leg portions of the turn-over member 55 may be secured to the vehicle body or frame in load-transmitting relation in any desired fashion, but in the embodiment shown the vehicle body 21 includes a body lock-pillar 56 which defines the rear edge of the door opening and is adapted to cooperate with a suitable door lock-pillar 57, and the turn-over member 55 engages the rear surface of the body lock-pillar 56, to which it may be suitably secured, as for example, by welding.

In some cases it may be desired to provide a roof structure free from protuberances such as those formed by the socket and dowel members 45 and 47, and in Figs. 12 and 13 such a flush construction is shown, the cooperating socket and dowel members being located in the edges and beneath the upper surfaces of the center panel and the cooperating closure panels. As shown in Figs. 12 and 13 the center panel 58, which corresponds to the center panel 37 in the previous embodiment, is provided with a gutter 59 for receiving a suitably formed rubber sealing strip 60. The vertical leg of the gutter 59 is cut away at suitable intervals and bent rearwardly to provide a flange 61 (Fig. 12) on which is supported a socket member 62 for cooperation with a dowel member 63 mounted as shown in the corresponding edge of a closure panel 64 which is in general similar to the closure panels 38 and 39. The sealing strip 60 which extends entirely around the top opening includes a vertical flange 65 adapted to be compressed between the edges of the closure panel 64 and the vertical wall of the gutter 59 when the panel is assembled and secured in the top opening, and this vertical flange 59 is interrupted adjacent the socket members 62 (Fig. 12) to permit insertion of the dowels into the corresponding sockets.

While particular embodiments of the invention have been shown, it will be understood, of course, that the invention is not to be limited thereto, since many modifications may be made, and it is contemplated, therefore, by the appended claims, to cover any such modifications as fall within the true spirit and scope of the invention.

What is claimed and desired to be secured by Letters Patent of the United States is:

1. In a vehicle having a passenger compartment provided at the forward end thereof with an upwardly extending windshield structure, the combination of a rigid top member including a rear portion substantially the width of said compartment extending upwardly from the rear edge of said compartment and forwardly thereover to substantially the middle thereof, and a center panel portion of substantially less than one third the width of said rear portion and integral therewith extending forwardly from said rear portion and rigidly secured to said windshield structure whereby a rigid top structure is provided having openings therein bounded on three sides by said top portion, said center panel portion and said windshield structure, a pair of closure panels adapted to be disposed within said openings, and means for removably securing said closure panels in said openings, whereby said panels may be selectively disposed within and readily removed from said openings to change from a substantially open compartment to an enclosed compartment and vice versa.

2. In a vehicle having a passenger compartment provided at the forward end thereof with an upwardly extending windshield structure, the combination of a rigid top member including a rear portion of substantially the width of said compartment extending upwardly from the rear edge of said compartment and forwardly thereover to substantially the middle thereof, and a center panel portion of substantially less than one third the width of said rear portion and integral therewith extending forwardly from said rear portion and rigidly secured to said windshield structure whereby a rigid top structure is provided having openings therein bounded on three sides by said rear top portion, said center panel portion and said windshield structure, a pair of closure panels one adapted to be disposed in each of said openings, cooperating means on said panels and the periphery of said openings for supporting said panels in said openings, whereby said panels may be readily removed or replaced by other closure panels of a configuration substantailly identical with that of said pair of closure panels.

3. In a vehicle having a passenger compartment with a seat therein and windshield structure at the front of said compartment, the combination of a rigid top member rigidly secured to the vehicle and including a first portion of substantially the width of said compartment extending over a substantial portion of the vehicle and a center panel portion integral with said first portion having a width substantially less than one-third of the width of the said first portion and a length such as to give ready access to said seat through openings in said member defined in part by said first portion and center panel portion, a pair of closure panels adapted to be disposed within said openings, and means for removably securing said closure panels in said openings, whereby said panels may be selectively disposed in and readily removed from said openings to change a substantially open type construction to a substantially enclosed type construction and vice versa.

4. In a vehicle having a passenger compartment including a front passenger portion and a rear passenger portion with forwardly extending windshield structure at the forward end of said front passenger portion, the combination of a rigid top member including a first part of substantially the width of either of said passenger portions extending over substantially all of one of said passenger portions and being rigidly supported on said vehicle and a center panel part of substantially less than one-third of the width of the said first part and integral therewith extending over the other of said passenger portions and rigidly secured to the vehicle at the end remote from said first part, whereby a rigid top structure is provided having openings therein bounded on two sides by said first top part and said center panel part, a pair of closure panels one adapted to be disposed in each of said openings, and means for removably securing said closure panels in said openings, whereby said panels may be selectively disposed within and readily removed from said openings to change a substantially open compartment to an enclosed compartment and vice versa.

GORDON M. BUEHRIG.

REFERENCES CITED

The following references are of record in the file of this patent:

UNITED STATES PATENTS

| Number | Name | Date |
|---|---|---|
| 1,229,746 | Hale | June 12, 1917 |
| 2,104,989 | Hicks | Jan. 11, 1938 |
| 2,141,298 | Heinz | Dec. 27, 1938 |
| 2,157,649 | Eksergian | May 9, 1939 |
| 2,434,711 | Mobbs et al. | Jan. 20, 1948 |

FOREIGN PATENTS

| Number | Country | Date |
|---|---|---|
| 441,648 | Germany | Mar. 7, 1927 |